US012699724B2

(12) United States Patent (10) Patent No.: US 12,699,724 B2
You et al. (45) Date of Patent: Aug. 4, 2026

(54) DYNAMIC AND PRECISE WEBSITE CATEGORIZATION USING A LARGE LANGUAGE MODEL

(71) Applicant: Palo Alto Networks, Inc., Santa Clara, CA (US)

(72) Inventors: Zeyu You, Santa Clara, CA (US); Wei Wang, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 8 days.

(21) Appl. No.: 18/954,288

(22) Filed: Nov. 20, 2024

(65) Prior Publication Data

US 2026/0140993 A1 May 21, 2026

(51) Int. Cl.
*G06F 16/353* (2025.01)
*G06F 16/955* (2019.01)
*G06F 40/30* (2020.01)

(52) U.S. Cl.
CPC ........ *G06F 16/353* (2019.01); *G06F 16/9566* (2019.01); *G06F 40/30* (2020.01)

(58) Field of Classification Search
CPC ............... G06F 16/353; G06F 16/9566; G06F 16/6235; G06F 16/45; G06F 16/285; G06F 40/30

USPC .......................................................... 707/737
See application file for complete search history.

(56) References Cited

U.S. PATENT DOCUMENTS

| | | | |
|---|---|---|---|
| 8,539,329 B2 * | 9/2013 | Wilson ................ | G06F 16/9535 707/710 |
| 12,259,921 B1 * | 3/2025 | Guriel ..................... | G06F 16/45 |
| 2012/0259856 A1 * | 10/2012 | Gehrking .............. | G06F 16/285 707/E17.09 |
| 2019/0361945 A1 * | 11/2019 | Chang ................... | G06F 16/285 |
| 2023/0020779 A1 * | 1/2023 | Roberts .................. | G06F 40/30 |

* cited by examiner

*Primary Examiner* — Shahid A Alam
(74) *Attorney, Agent, or Firm* — Van Pelt, Yi & James LLP

(57) ABSTRACT

A concept tagging model is trained based at least in part on a result of a large language model used to analyze training data. Text content of a website is received. The concept tagging model is applied to the text content to identify one or more concept terms in the text content. An embedding model is applied to the identified one or more concept terms to determine one or more embeddings. Using the one or more embeddings, a closest matching granular category in a taxonomy of categories is identified for the website.

21 Claims, 8 Drawing Sheets

Start

Receive text content of websites ⟶402

Prompt LLM to label received text content based on specified phrases ⟶404

Train concept tagging model using website data with LLM generated labels ⟶406

End

Start

Receive concept terms of text content associated with one or more websites ⟵702

Cluster the concept terms ⟵704

Determine a potential new granular website categorization category ⟵706

End

DYNAMIC AND PRECISE WEBSITE CATEGORIZATION USING A LARGE LANGUAGE MODEL

BACKGROUND OF THE INVENTION

The rise of user tailored experiences while navigating the Internet has led to increased classification and analysis of large amounts of Internet data, particularly websites. Tailoring a user's experience while navigating the Internet often requires filtering websites based on its categorization. Given the large number of new and existing websites, it would be infeasible to manually categorize websites. Although automated analysis can be used to generally categorize websites, the computational approach is incredibly resource demanding, requiring extensive annotated datasets to train algorithms to perform granular categorization. The automated analysis can struggle with adaptation and precision, often requiring periodic human intervention to maintain accuracy. Therefore, there exists a need for more efficient and versatile categorization of websites.

BRIEF DESCRIPTION OF THE DRAWINGS

Various embodiments of the invention are disclosed in the following detailed description and the accompanying drawings.

DETAILED DESCRIPTION

Figure 1:
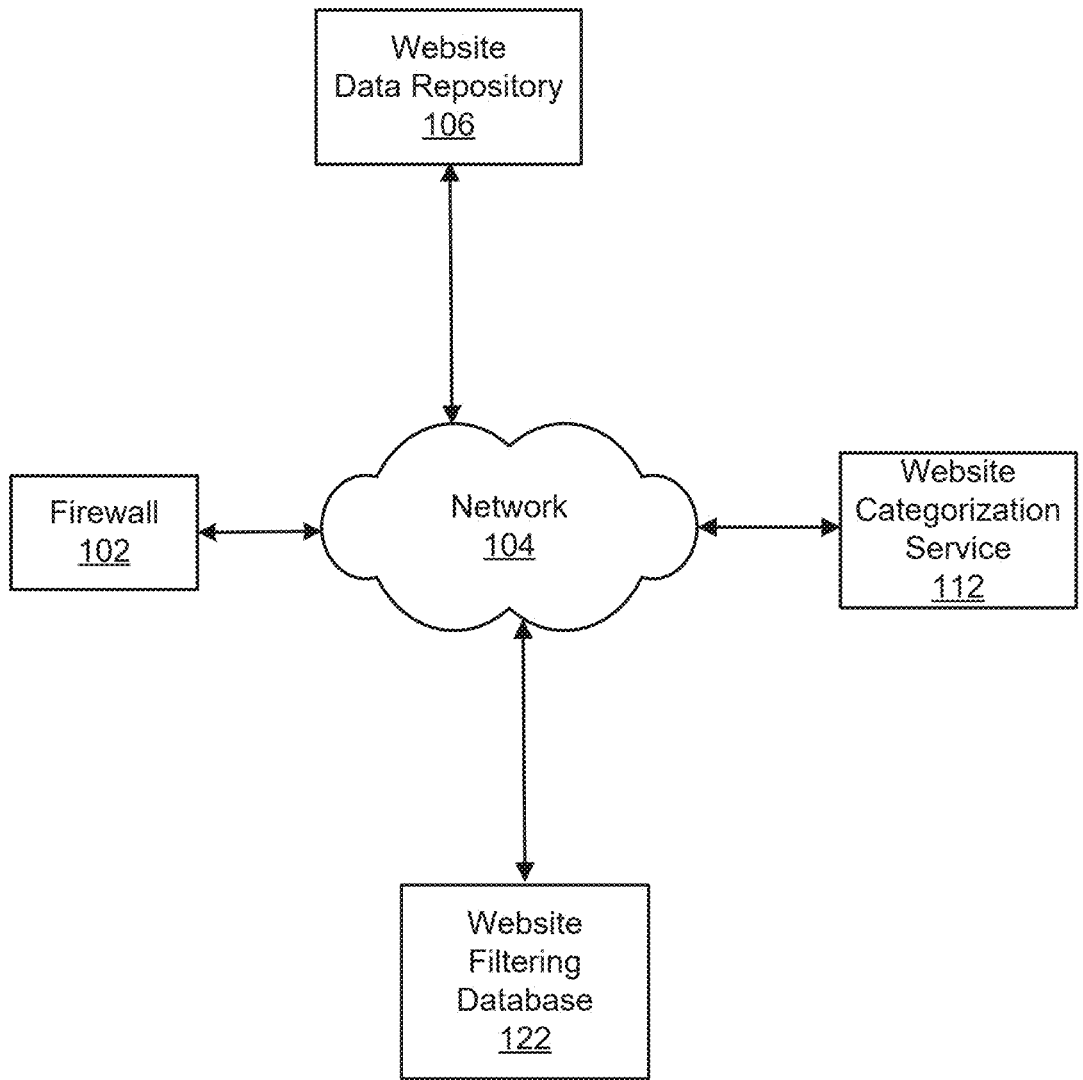
FIG. 1 is a block diagram illustrating an example of a network environment for performing advanced website categorization.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced website categorization for dynamic and precise website classification is disclosed. For example, an advanced website categorization service utilizes one or more large language models to perform dynamic and precise website classification. In some embodiments, Hypertext Markup Language (HTML) data is scraped from a website and received. The received HTML data is analyzed by one or more large language models to determine a precise categorization for the corresponding website in a hierarchy of categories. In some embodiments, one or more of the large language models used to analyze the received website data is trained on data labeled by one or more large language models. Computational analysis of website data by a series of machine learning models enables the website data to be efficiently categorized based on dimensions and relationships indeterminable by humans. In addition, the use of large language models allows website data to be grouped and compactly expressed to promote additional categories and category relationships, introducing dynamic granular categorization of website data. Categorization of websites can then be utilized by a client using a firewall to protect, personalize, or tailor their Internet navigation experience.

In some embodiments, a concept tagging model is trained based at least in part on a result of a large language model used to analyze training data. For example, a large language model outputs labeled training data based on a specific large language model prompt, and the training data is utilized to train a concept tagging model. Text content of a website to be categorized is received, and the concept tagging model is applied to the text content to identify one or more concept terms in the text content. For example, the concept tagging model determines one or more concept tags and concept phrases associated with the text content. An embedding model is applied to the identified one or more concept terms to determine one or more embeddings. For example, the one or more concept terms are translated into a numerical representation so that they can be quantitatively compared to other concept terms. One or more of the embeddings are used to identify a closest matching granular category in a taxonomy of categories for the website. As an example, a website is classified into a taxonomy of categories based on its mathematical relationships to the categories. As another example, a new category is proposed and implemented to maintain accuracy and enhance precision of the website categorization. In some embodiments, a fallback document classification model for website categorization is utilized to categorize the website if no related category can be identified using the embeddings.

FIG. 1 is a block diagram illustrating an example of a network environment for performing advanced website categorization. In the example shown, firewall 102, Website data repository 106 (e.g., storing HTML data), website categorization service 112, and website filtering database 122 (e.g., storing uniform resource locator (URL) filtering data) are connected via network 104. Network 104 can be a public or private network. In some embodiments, network 104 is a public network such as the internet. Examples of network 104 include one or more of the following: a direct or indirect physical communication connection, internet, intranet, Local Area Network, Wide Area Network, Storage Area Network, and any other form of connecting two or more systems, components, or storage devices together. Website categorization service 112 is communicatively connected to firewall 102 and utilizes website data repository 106 and a URL filtering data repository as modules in its website categorization process.

In some embodiments, firewall 102 is an example firewall with a website categorization service such as website categorization service 112. For example, firewall 102 monitors data traffic between the internet and a client and uses website categorization service 112 to determine which websites to filter (e.g., allow, block, modify, etc.). In various embodiments, the client using firewall 102 can indicate preferences for website filtering via firewall 102, and the preferences are relayed from firewall 102 to website categorization service 112 via network 104. Website categorization service 112 performs according to the preferences received, allowing for a personalized experience while navigating the internet.

In some embodiments, website data repository 106 provides HTML text data of websites to website categorization service 112. For example, HTML text data is uploaded to website categorization service 112 via network 104, and website categorization is performed on the HTML text data. In some embodiments, an HTML text data repository stores HTML text data of websites and the HTML text data of a website is represented together in one or more data structures such as a file, record, or document. In some embodiments, HTML text data repository receives HTML text data from a web crawler.

In some embodiments, website categorization service 112 is a service that classifies websites based on a categorization hierarchy. For example, categories are provided to website categorization service 112 and website categorization service 112 classifies websites according to the provided categories. In some embodiments, website categorization service 112 implements one or more machine learning models to perform dynamic and precise classification. Results from website categorization service 112 are sent to website filtering database 122 via network 104. In some embodiments, website categorization service 112 is composed of one or more modules. Examples of modules include machine learning models, large language models, classifier models, embedding models, data repositories, or any other module that can be used to store or analyze data.

In some embodiments, website filtering database 122 stores categorization data of websites based on the results of website categorization service 112. The categorization data may be retrieved by network 104 and utilized by firewall 102 to provide a personalized experience while navigating the internet. For example, website categorization results stored in the website filtering data repository are used to filter out undesired websites or quickly locate desired websites. In some embodiments, the website categorization results are used as a security feature implemented by firewall 102.

In some embodiments, the components shown in FIG. 1 may exist in various combinations of hardware machines. Although single instances of some components have been shown to simplify the diagram, additional instances of the components shown in FIG. 1 may exist. For example, website categorization service 112 can include one or more servers. The included servers can include distributed servers, application servers, and database servers, among others. In some embodiments, components not shown in FIG. 1 may also exist.

Figure 2:
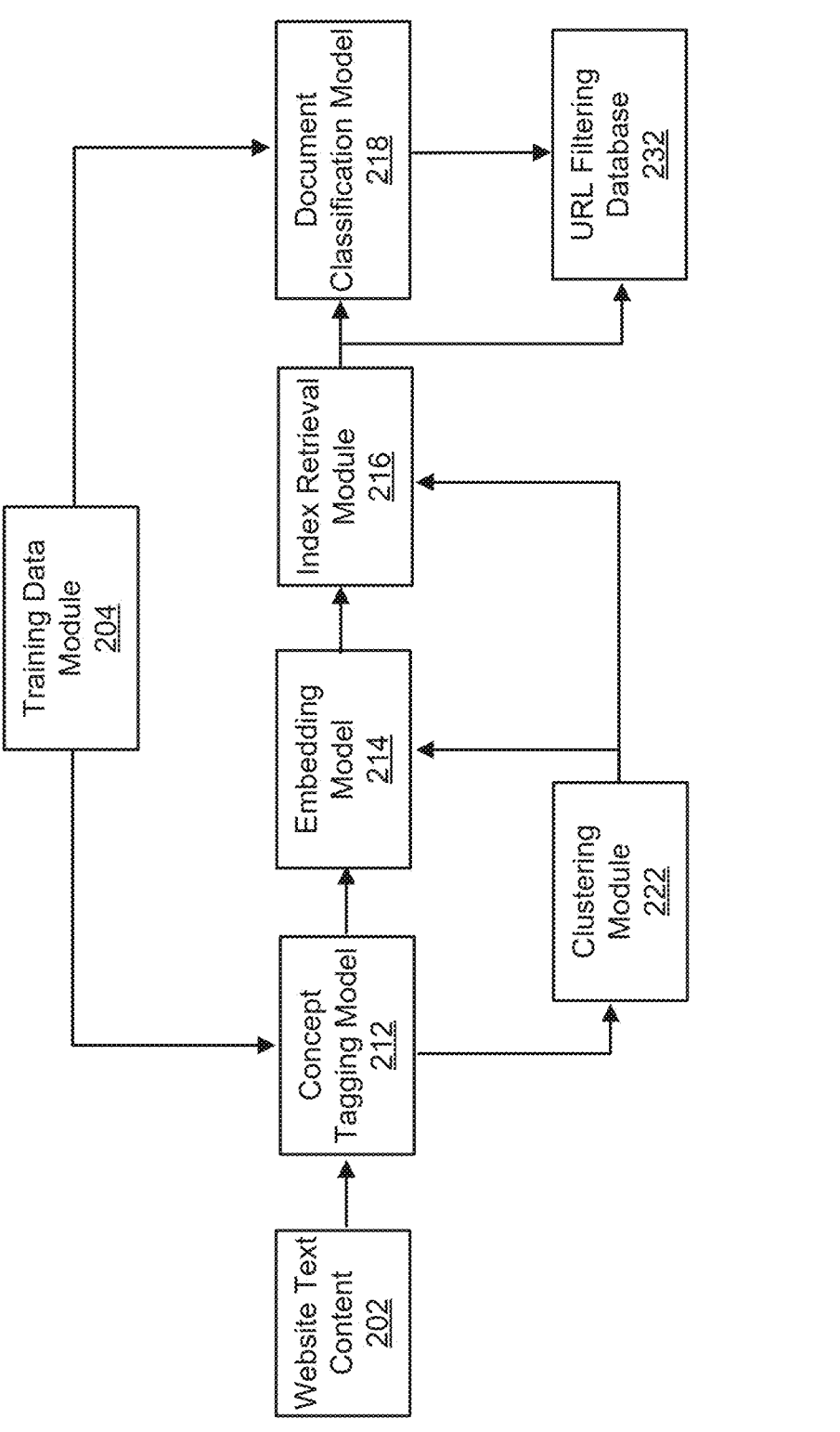
FIG. 2 is a block diagram illustrating an embodiment of components of a website categorization service.

FIG. 2 is a block diagram illustrating an embodiment of components of a website categorization service. For example, using the components of FIG. 2, the text content of a website is analyzed to determine a precise granular content category for the website and the assigned category is recorded. In various embodiments, training data module (e.g., LLM label agencies) 204, concept tagging model 212, embedding model 214, index retrieval module 216, document classification model 218, and clustering module 222 form example components of website categorization service 112 of FIG. 1. In some embodiments, URL filtering database 232 is website filtering database 122 of FIG. 1.

In some embodiments, website text content 202 is input to concept tagging model 212 to generate possible concept tags associated with the semantic meaning of the website text content. The output of concept tagging model 212 is embedded by embedding model 214. The embeddings are analyzed by index retrieval model 216 to determine a precise granular website content category. If a precise granular website content category is determined, the identified category and the website details are stored in a website filtering database, such as URL filtering database 232 or website filtering database 122 of FIG. 1. Document classification model 218 serves as a secondary fallback model for determining a content category.

In some embodiments, training data module 204 is a set of one or more structural units used to train concept tagging model 212 and document classification model 218. As an example, training data module 204 contains labeled training data for concept tagging model 212 and labeled training data for document classification model 218. In some embodiments, the labeled training data for one or both models is produced at least in part by one or more large language models. Training data module 204 is responsible for optimizing the performance of concept tagging model 212 and document classification model 218 until a desired performance level is reached.

In some embodiments, clustering module 222 is a set of one or more structural units for identifying and proposing new categories for website text content. Concept tags are received at clustering module 222 and clustered to determine new categories to improve the alignment between assigned concept tags and the semantic meaning of website text content. Proposed categories are embedded and referenced by embedding model 214. In some embodiments, clustering module 222 is also connected with index retrieval module 216 to propose and store new categories. Clustering module 222 may receive and use embeddings from embedding module 214 as a factor for proposing new categories.

Figure 3:
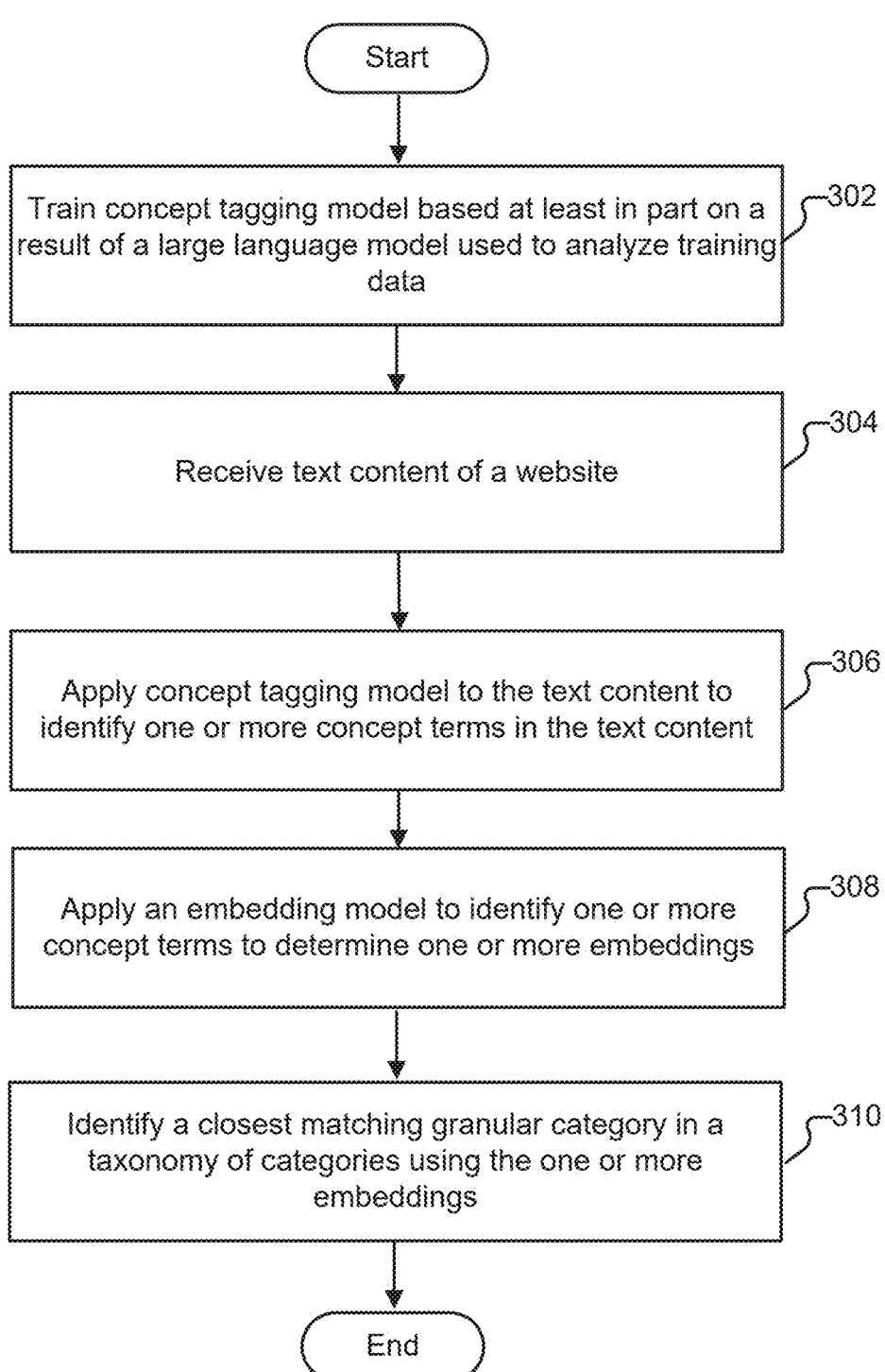
FIG. 3 is a flow chart illustrating an embodiment of a process for website categorization leveraging a large language model.

FIG. 3 is a flow chart illustrating an embodiment of a process for website categorization leveraging a large language model. For example, using the process of FIG. 3, website data is processed by one or more machine learning models to determine a precise category of a hierarchy of categories. In some embodiments, the process of FIG. 3 is executed by website categorization service 112 of FIG. 1. In some embodiments, the process of FIG. 3 is executed by one or more components in FIG. 2.

At 302, a concept tagging model is trained based at least in part on a result of a large language model used to analyze training data. In some embodiments, training data is extracted from HTML data of a website. For example, the training data contains content and structural data of a website. In some embodiments, the result of the large language model is generated in response to a prompt to identify, in the training data, one or more concept terms belonging to one or more specified concepts. The concept tags and concept phrases can be based at least in part on user specified preferences. In various embodiments, training a concept tagging model on the output of a large language model includes using the output of the large language model as annotated data to teach the concept tagging model to accurately identify concept phrases and concept tags associated with the semantic meaning of website text data.

At 304, text content of a website is received. In some embodiments, the text content includes portions identified from the website as semantic text artifacts. For example, the text content includes the words displayed on the website. In various embodiments, the text content includes HTML text data of a website. Text content of a website can be received directly from a web scraper or a data repository. In some embodiments, the data repository is website data repository 106 of FIG. 1 and HTML text data is received via network 104 of FIG. 1. The corresponding website of the received content is one of a plurality of crawled websites to be categorized.

At 306, the concept tagging model is applied to the text content to identify one or more concept terms in the text content. For example, the text content contains semantic text artifacts and the concept tagging model determines one or more concept terms based on the semantic meaning of the text content. The concept terms may include concept tags and or concept phrases. For example, the concept tagging model is trained to identify content concept terms (e.g., terms belonging to higher level AI classification) and identifies the tags and phrases (e.g., "AI," "machine learning," "artificial intelligence," and "predictive analysis") from the text content. As another example, the concept tagging model is also trained to identify service concept terms (e.g., describing service of the website) and identifies the tags and phrases (e.g., "writing and grammar checker tool," "writing assistant," and "grammar checker") from the text content. The concept terms can be from a predetermined list, specified in the prompt given to the concept tagging model, and/or based at least in part on user preferences. In some embodiments, the concept tagging model is concept tagging model 212 of FIG. 2. In some embodiments, the concept tagging model is a transformer language model. Applying a transformer language model to text content allows semantic patterns to be identified from text data that are too large to be manually analyzed. Additionally, a computational approach is more accurate, less time intensive, and less labor intensive than a manual approach utilizing human graders.

At 308, an embedding model is applied to identify one or more concept terms to determine one or more embeddings. For example, the concept terms identified by the concept tagging model during step 306 are passed into an embedding model and their corresponding embedding vectors are determined. In some embodiments, the concept terms are concatenated to determine to create a singular resultant embedding. For example, the corresponding concept terms of a website are used to create a corresponding embedding representing the semantic meaning of a website in multidimensional space for downstream processing. In some embodiments, the embeddings are represented as a vector, matrix, or any other data structure used to represent an embedding. In various embodiments, the embedding model is embedding model 214 of FIG. 2. Because the concept terms are converted into a numerical representation, the corresponding embedding of the concept terms can be quantitatively analyzed and compared to other embeddings.

At 310, a closest matching granular category in a taxonomy of categories is identified using the one or more embeddings. In some embodiments, the corresponding embeddings of granular categories in a taxonomy of categories are mathematically compared to the one or more embeddings identified at step 308. For example, a similarity value, dot product, or any other computation used to compare the distance between the two embeddings in multidimensional space is calculated. In some embodiments, if a threshold similarity value is satisfied between a reference embedding representing a granular category and a website embedding, the granular category is assigned to the website. In some embodiments, the closest matching granular category is identified through a k nearest neighbor (kNN) search for embeddings of predefined granular categories. In various embodiments, a fallback approach is implemented if a precise category cannot be determined using the identified one or more embeddings. For example, an independent text classification model is applied to determine a broader category. In some embodiments, embeddings that are not matched with a precise granular category are stored and used to propose additional granular categories. Mathematical comparison of textual data allows a precise granular category to be assigned to a website with high accuracy. In addition, proposing additional granular categories to the hierarchy of categories introduces adaptability to the advanced website categorization service, allowing accuracy to be maintained in unfamiliar situations. Example of categories in a taxonomy of categories include one or more of the following: Abortion, Abused Drugs, Adult, Alcohol and Tobacco, Artificial Intelligence, Auctions, Business and Economy, Command and Control, Computer and Internet Info, Content Delivery Networks, Copyright Infringement, Cryptocurrency, Dating, Dynamic DNS, Educational Institutions, Encrypted DNS, Entertainment and Arts, Extremism, Financial Services, Gambling, Games, Government, Grayware, Hacking, Health and Medicine, Home and Garden, Hunting and Fishing, Insufficient Content, Internet Communications and Telephony, Internet Portals, Job Search, Legal, Malware, Marijuana, Military, Motor Vehicles, Music, Newly Registered Domains, News, Not-Resolved, Nudity, Online Storage and Backup, Parked, Peer-to-peer, Personal Sites and Blogs, Philosophy and Political Advocacy, Phishing, Private IP Addresses, Proxy Avoidance and Anonymizers, Questionable, Ransomware, Real Estate, Real-Time Detection, Recreation and Hobbies, Reference and Research, Religion, Scanning Activity, Search Engines, Sex Education, Shareware and Freeware, Shopping, Social Networking, Society, Sports, Stock Advice and Tools, Streaming Media, Swimsuits and Intimate Apparel, Training and Tools, Translation, Travel, Unknown, Weapons, Web Advertisements, Web-based Email, Web Hosting. Each category may be associated with a risk rating (e.g., high-risk, medium-risk, or low-risk) that be used when filtering based on the category (e.g., block access to high-risk categories and allow access to low-risk categories). In some embodiments, the process of step 310 is performed by index retrieval module 216 of FIG. 2.

Figure 4:
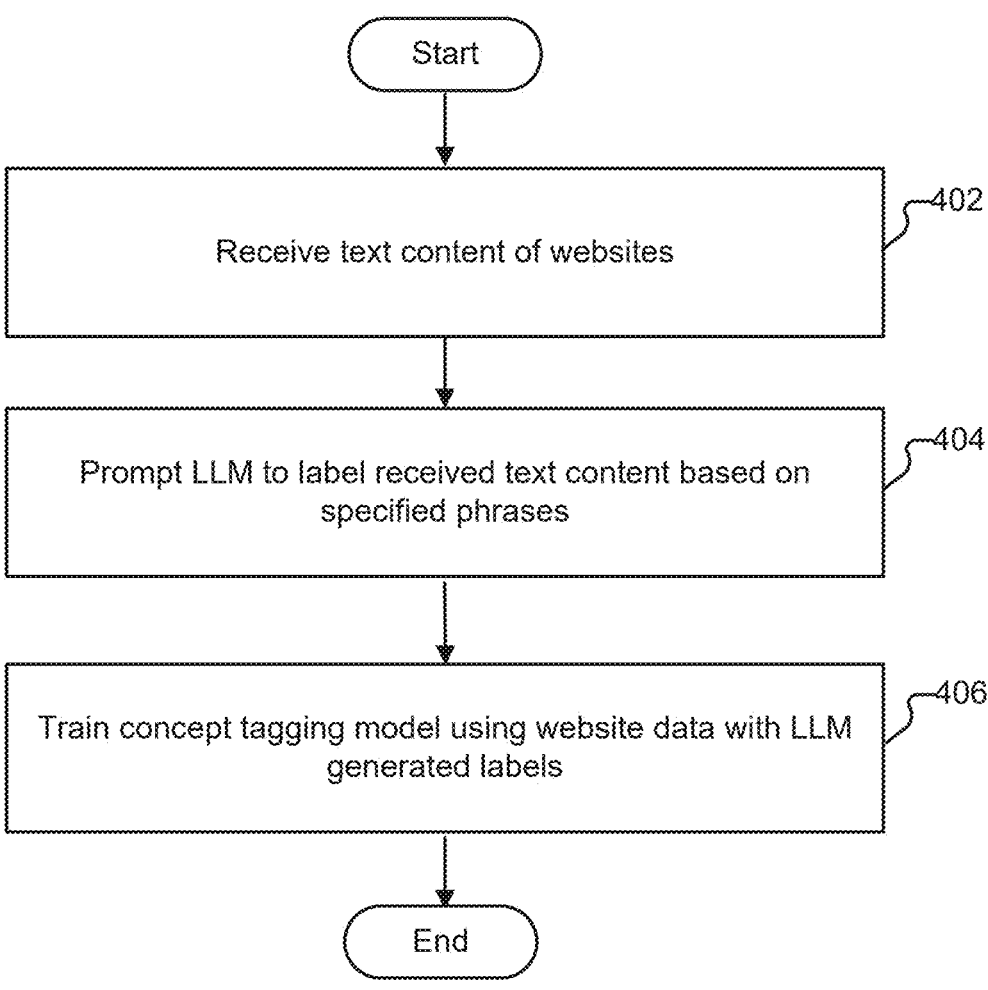
FIG. 4 is a flow chart illustrating an embodiment of a process for training a concept tagging model using an LLM.

FIG. 4 is a flow chart illustrating an embodiment of a process for training a concept tagging model using an LLM. For example, using the process of FIG. 4, a concept tagging model is trained using data annotated by an LLM. In some embodiments, the concept tagging model performance is optimized for accurate descriptions of text content of websites. In some embodiments, at least part of the process of FIG. 4 is executed by training data module 204 of FIG. 2 to train concept tagging model 212 of FIG. 2. In some embodiments, the process of FIG. 4 is included in step 302 of FIG. 3.

At 402, text content of websites is received. For example, the HTML text content of websites is received. In some embodiments, HTML text content is retrieved from a web crawler and received through a network. In some embodiments, HTML text content is received from website data repository 106 of FIG. 1. In some embodiments, HTML text content of a website details the text displayed on the website and readable by a user. As an example, the HTML text content of a website includes any information that can be visually read by a user on the website. In some embodiments, text or code not directly viewable by a user is not included in the text content of the website. In various embodiments, HTML text content is received and is used to categorize the corresponding website.

At 404, the LLM is prompted to label received text content based on specified phrases. In some embodiments, the specified phrases are based on online safety policies, permitted content guidelines, or user preferences. As an example, the LLM is prompted to identify several phrases and words related to each of the specified phrases from the HTML text content. In some embodiments, the extracted words and phrases are based on their relevance to the HTML text content. The following is an example of prompt instructions provided to the LLM:

> Given a webpage text, could you extract most dominant 2 to 3 phrases for 1. phrases up to 5 words in the input that talk about the concept of AI techniques (such as generative AI, copilot, chatbot, Natural Language Processing, computer vision, Machine Learning, GPTs, auto ml, etc.); 2. phrases up to 5 words in the input that talk about service provided (such as writing assistant, email assistant, code assistant, workflow automation, image generation, video generation, image editing, etc.); such that a summary of the text content can be used to describe the website.

At 406, the concept tagging model is trained using website data with LLM generated labels. In some embodiments, the generated output of the LLM contains the extracted phrases from website text content and the extracted phrases are used as labels for the text content. The labeled text content is provided to the concept tagging model to provide a schema for the expected output of the concept tagging model. As an example, the concept tagging model performance is optimized to extract concept phrases and tags from text content of websites and the concept phrases and tags are based on provided categories. In some embodiments, the concept tagging model is a machine learning model designed to process the semantic meaning of text. For example, the concept tagging model is a text transformer model, neural network model, support vector machine, or classification model.

Figure 5:
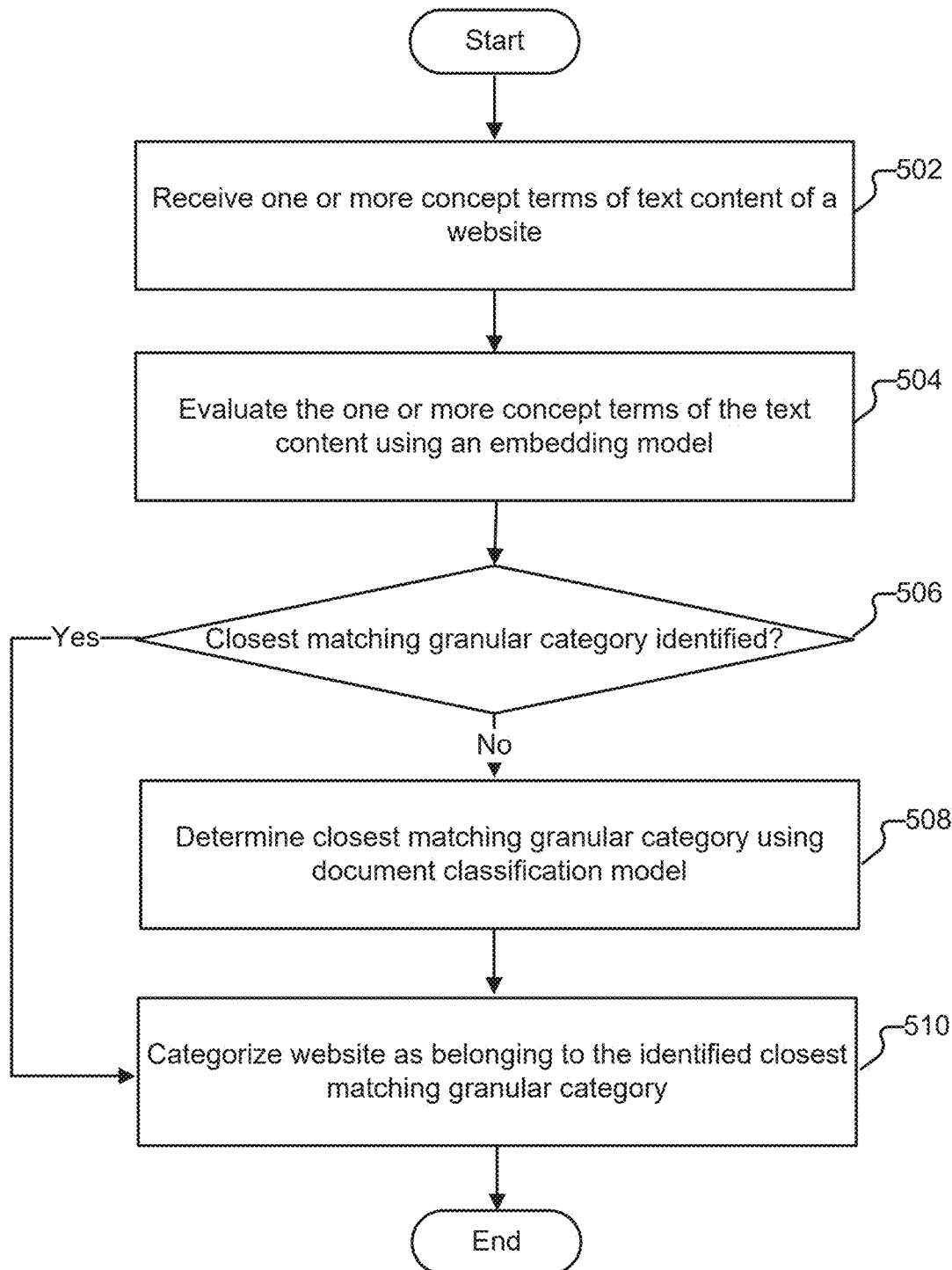
FIG. 5 is a flow chart illustrating an embodiment of a process for identifying a granular category for a website.

FIG. 5 is a flow chart illustrating an embodiment of a process for identifying a granular category for a website. For example, using the process of FIG. 5, the closest matching granular category in the taxonomy of categories is identified for a website based on its text content. The closest matching granular category can be identified based on the embeddings of text content of the website. In various embodiments, in an event the closest matching granular category cannot be identified based on the embeddings, a fallback mechanism exists and is implemented to identify the closest matching granular category. Examples of fallback mechanisms include but are not limited to a current existing solution for granular categorization of websites, a fallback machine learning model, or any other tool or method used to categorize text-based entities. In some embodiments, the process of FIG. 5 is executed by website categorization service 112. In some embodiments, the process of FIG. 5 is executed using embedding model 214, index retrieval module 216, and document classification model 218 of FIG. 2.

At 502, one or more concept terms of text content of a website are received. In some embodiments, the concept terms are received from a concept tagging model, such as concept tagging model 212 of FIG. 2. For example, the concept terms output by concept tagging model 212 of text content of a website are received. An indication of the website related to the concept terms is also received. The concept terms may be received as a file, text, vector, string, or any other data structure that can represent text. In some embodiments, the concept terms are related to AI, service, or any other specified concepts.

At 504, the one or more concept terms of the text content are evaluated using an embedding model. For example, one or more concept terms of text content for a website is input to the embedding model and the associated embeddings are outputted. In some embodiments, the received concept terms are processed before they are input into the embedding model. For example, the concept terms are tokenized or at least one of the concept terms is tokenized. As another example, the concept terms are concatenated into one larger representation to be evaluated by the embedding model. In some embodiments, concept terms of each website are embedded separately, and their embeddings are combined into a larger representative embedding. The embedding or embeddings representing the identified and received concept terms of a website can be vectors, matrices, or any other data structures used to represent embeddings.

At 506, it is determined whether the closest matching granular category is identified. For example, a representative granular category in a taxonomy of granular categories may be determined. In various embodiments, the embeddings are retrieved from an embedding model, such as embedding model 212 of FIG. 2, and analyzed by an index retrieval module, such as index retrieval module 216 of FIG. 2. In some embodiments, the closest matching granular category is identified based on one or more comparisons of the one or more embeddings with a reference embedding for the closest matching granular category. In some embodiments, the comparison is based on a similarity measurement computed between the representative embedding of the website and the reference embeddings of the granular categories. As an example, a k-nearest-neighbor algorithm is applied and the corresponding granular category to the reference embedding within a specified threshold distance that is closest in distance to the embedding of the text content of a website is identified as the closest matching granular category for the website. In various embodiments, one closest matching granular category is identified based on a plurality of embeddings representing identified concept terms of a website. For example, the corresponding granular category of the embedding most similar to the plurality of embeddings representing the semantic meaning of the website is identified as the closest matching granular category. Additional examples of methods to measure similarity in addition to the k-nearest-neighbor algorithm include but are not limited to dot product, inner product, cosine similarity, and distance between coordinates in multidimensional space. If at 506 it is determined that a closest matching granular category is identified, such that an embedding of a granular category is within a threshold similarity or distance to the one or more embeddings of the website, then the process proceeds to step 510. If at 506 it is determined that a closest matching granular category is not identified, the process proceeds to 508. In some embodiments, in response to a determination that the closest matching granular category does not meet a match threshold, a fallback document classification model is applied to the website to determine a closest matching general category in the taxonomy of categories and the website is categorized as belonging to the identified closest matching general category.

At 508, a closest matching granular category is determined using a document classification model. For example, an independently trained text-classification bidirectional encoder representation from transformers (BERT) model is applied to the text content of the website to determine a granular category. In some embodiments, the fallback document classification model is document classification model 218 of FIG. 2. The fallback document classification model can be trained by training data module 204 of FIG. 2 or trained separately. In some embodiments, the document classification model receives the entire HTML text content of a website and outputs the identified granular category. The granular category may be more general than the categories identified in step 506 but is still part of the taxonomy of categories. In some embodiments, HTML text content and/or the document classification model determined matching granular category is stored in a data repository that may be used to suggest additional granular categories.

At 510, the website is categorized as belonging to the identified closest matching granular category. For example, in response to a determination that the closest matching granular category meets a match threshold from either step 506 or 508, the website is categorized as belonging to the identified closest matching granular category. In some embodiments, categorizing the website as belonging to its identified closest matching category includes applying the closest matching category as a label, tag, or descriptor to the website. The categorization may be used by a firewall to filter the website requested to be accessed.

Figure 6:
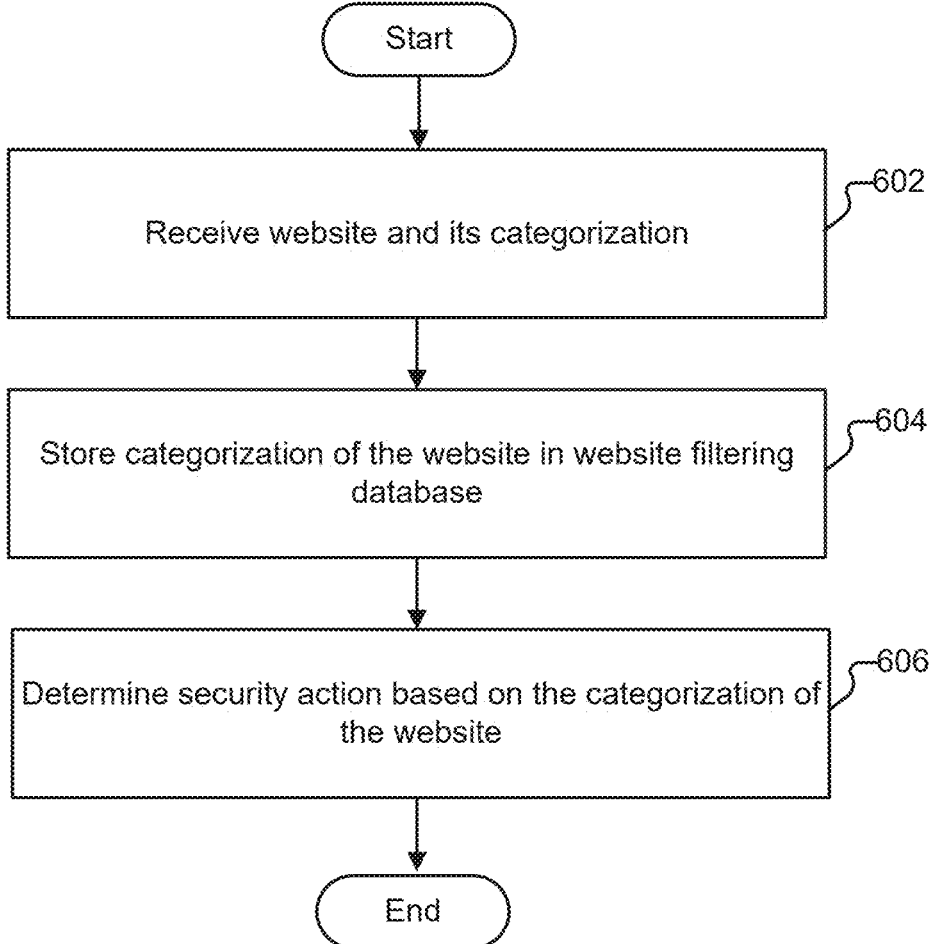
FIG. 6 is a flow chart illustrating an embodiment of a process for performing a responsive action in response to granular categorization of a website.

FIG. 6 is a flow chart illustrating an embodiment of a process for performing a responsive action in response to granular categorization of a website. For example, using the process of FIG. 6, the website and its determined granular categorization are stored and a security action appropriate to the granular categorization is executed. In some embodiments, the process of FIG. 6 is executed after the process of FIG. 3 or the process of FIG. 5.

At 602, a website and its categorization are received. For example, the website and its categorization are received from website categorization service 112 via network 104 of FIG. 1. In some embodiments, the website and its categorization are received from embedding model 214 of FIG. 2. In some embodiments, the website and its categorization are received from document classification model 218. The website and its categorization may consist of identifying information of the website, such as an IP address, domain name, meta data, domain registration data, or domain name service (DNS) AAAA and A records. The website and its categorization may be received as a file, record, vector, or any other method of representing text.

At 604, the categorization of the website is stored in a website (e.g., Uniform resource Locator (URL)) filtering database. In some embodiments, the website filtering database is website filtering database 122 of FIG. 1 and URL filtering database 232 of FIG. 2. The data may be stored in the format received, compressed into a smaller format, or translated into a different format. In various embodiments, at least the website is identified by its URL in the website filtering database. In some embodiments, within the website filtering database, all the websites with the same determined granular category are clustered and stored nearby each other. For example, the storage structure of the website filtering database represents the hierarchy of categories, such that websites with similar categories are stored structurally near each other.

At 606, a security action based on the categorization of the website is determined. For example, it is determined whether to allow access to the website based on the categorization of the website. If access to a certain website category of the website is not allowed, the access to the website is blocked. Access to the website may be based on online safety guidelines, the user's security preferences, or the policy of the organization implementing the advanced website categorization service into their firewall. In some embodiments, the security action is executed by a firewall with the advanced website categorization service. For example, when a user attempts to access a website, the firewall determines whether access should be allowed based on the website's determined granular categorization found in the website filtering database. In some embodiments, the firewall, the advanced website categorization service, and the website filtering database are firewall 102, website categorization service 112, and website filtering database 122 of FIG. 1, respectively.

Figure 7:
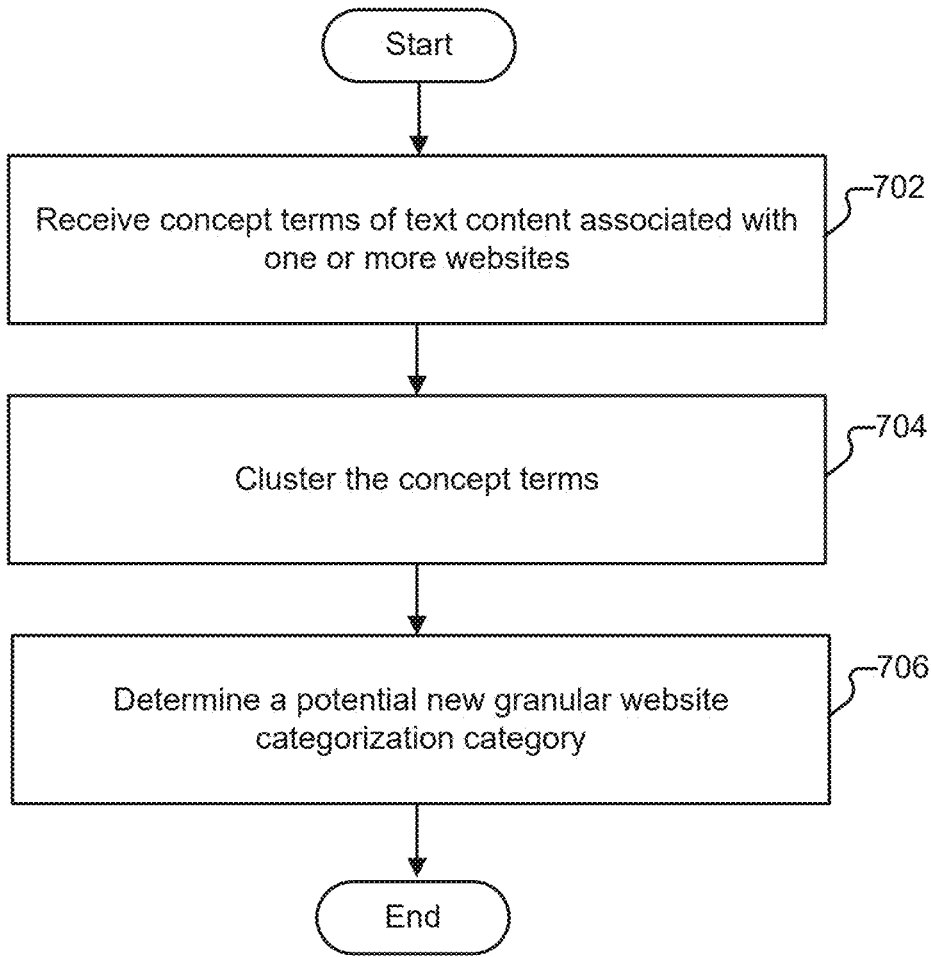
FIG. 7 is a flow chart illustrating an embodiment of a process for proposing new granular categories for the website categorization service.

FIG. 7 is a flow chart illustrating an embodiment of a process for proposing new granular categories for the website categorization service. For example, using the process of FIG. 7, the identified one or more concept terms in the text content are clustered to determine a potential new granular category to be included in the taxonomy of categories. In some embodiments, the process of FIG. 7 is executed after step 306 of FIG. 3. In some embodiments, the process of FIG. 7 is executed by clustering module 222 of FIG. 2.

At 702, the concept terms of text content associated with one or more websites is received. In some embodiments, the concept terms of text content are received from a concept tagging model, such as concept tagging model 212 of FIG. 2. The concept terms represent the text content of the websites such that each concept term is a prevalent idea present in the text content of a website. In some embodiments, embeddings of the received concept terms are also received.

At 704, the concept terms are clustered. For example, concept terms that have similar semantic meaning are grouped together. Similarity in semantic meaning may be determined by one or a plurality of methods, including but not limited to implementing a machine learning model, embedding model, large language model, or algorithm. These methods may utilize vector representation, knowledge-based similarity, or distanced-based similarity to cluster concept terms. In some embodiments, a threshold similarity value is specified to improve similarity among a clustered group of concept terms. In some embodiments, the concept terms are clustered based on their received embeddings from an embedding model, such as embedding module 214 of FIG. 2. In some embodiments, clustering of concept terms is executed by clustering module 222 of FIG. 2.

At 706, a potential new granular website categorization category is determined. For example, for each clustered group of concept terms, a new concept term is suggested. In some embodiments, the concept term is identified by one or more methods including but not limited to an embedding model, natural language processing, machine learning model, or large language model. Suggested new granular categories are concept terms not currently present in the taxonomy of categories. In some embodiments, the determined new granular categories may be based on concept tags specified in earlier steps. In some embodiments, the determined new granular categories are sent to index retrieval module of FIG. 2 to be added to the hierarchy of granular categories. In some embodiments, determined new granular categories are provided to embedding model 214 of FIG. 2 or are reviewed by a human before its implementation into the current taxonomy of categories. The clustering feature of the advanced website categorization service provides a dynamic component to the service, allowing the service to maintain its precision as more websites are categorized.

Figure 8:
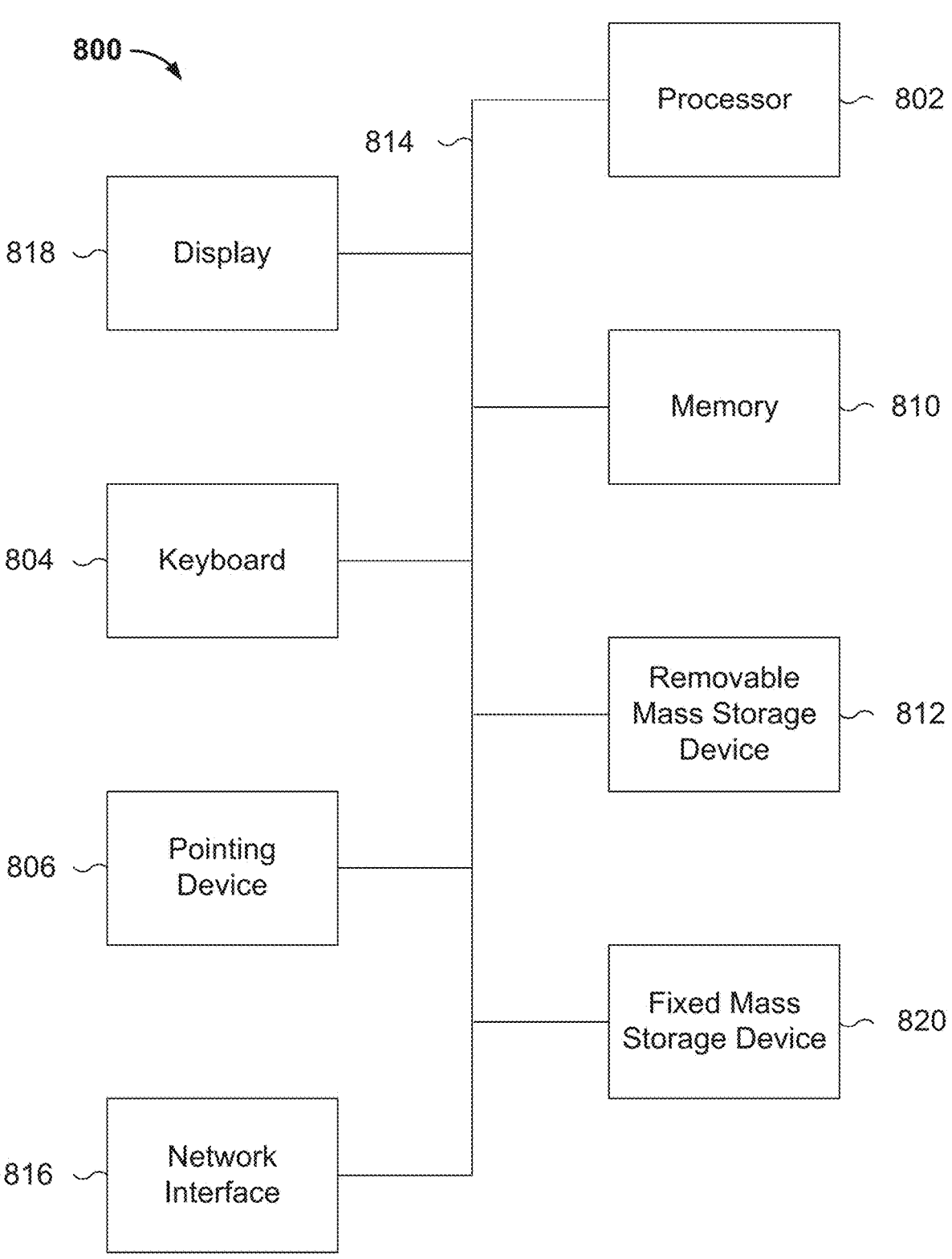
FIG. 8 is a functional diagram illustrating a programmed computer system for advanced website categorization leveraging large language models for dynamic and precise HTML classification.

FIG. 8 is a functional diagram illustrating a programmed computer system for advanced website categorization leveraging large language models for dynamic and precise HTML classification. As will be apparent, other computer system architectures and configurations can be utilized for advanced website categorization. Examples of computer system 800 include firewall 102 of FIG. 1, one or more computers used to implement website data repository 106 of FIG. 1, one or more computers used to implement website categorization service 112 of FIG. 1, and one or more computers used to implement website filtering database 122 of FIG. 1. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In various embodiments, one or more instances of computer system 800 can be used to implement at least portions of the processes of FIGS. 3-7.

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or unidirectional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or unidirectionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   training a concept tagging model based at least in part on a result of a large language model used to analyze training data;
   receiving text content of a website;
   applying the concept tagging model to the text content to identify one or more concept terms in the text content;
   applying an embedding model to the identified one or more concept terms to determine one or more embeddings;
   using the one or more embeddings to identify, for the website, a closest matching granular category in a taxonomy of categories; and
   in response to a determination that the closest matching granular category does not meet a match threshold, applying a fallback document classification model to the website to determine a closest matching general category in the taxonomy of categories and categorizing the website as belonging to the identified closest matching general category.

2. The method of claim 1, wherein the result of the large language model is generated in response to a prompt to identify in the training data one or more concept terms belonging to one or more specified concepts.

3. The method of claim 1, wherein the concept tagging model is a transformer language model.

4. The method of claim 1, wherein the website is one of a plurality of crawled websites to be categorized.

5. The method of claim 1, wherein the text content includes portions identified from the website as semantic text artifacts.

6. The method of claim 1, further comprising based on clustering the identified one or more concept terms in the text content, determining a potential new granular category to be included in the taxonomy of categories.

7. The method of claim 1, wherein the closest matching granular category is identified based on one or more comparisons of the one or more embeddings with a reference embedding for the closest matching granular category.

8. The method of claim 1, further comprising in response to a determination that the closest matching granular category meets a match threshold, categorizing the website as belonging to the identified closest matching granular category.

9. The method of claim 8, further comprising storing the categorization of the website in a Uniform Resource Locator (URL) filtering database.

10. The method of claim 8, further comprising determining whether to allow access to the website based on the categorization of the website.

11. A system, comprising:
   a processor configured to:
      train a concept tagging model based at least in part on a result of a large language model used to analyze training data;
      receive text content of a website;
      apply the concept tagging model to the text content to identify one or more concept terms in the text content;
      apply an embedding model to the identified one or more concept terms to determine one or more embeddings;
      use the one or more embeddings to identify, for the website, a closest matching granular category in a taxonomy of categories; and
      in response to a determination that the closest matching granular category does not meet a match threshold, apply a fallback document classification model to the website to determine a closest matching general category in the taxonomy of categories and categorize the website as belonging to the identified closest matching general category; and
   a memory coupled to the processor and configured to provide the processor with instructions.

12. The system of claim 11, wherein the result of the large language model is generated in response to a prompt to identify in the training data one or more concept terms belonging to one or more specified concepts.

13. The system of claim 11, wherein the processor is further configured to: based on clustering the identified one or more concept terms in the text content, determine a potential new granular category to be included in the taxonomy of categories.

14. The system of claim 11, wherein the closest matching granular category is identified based on one or more comparisons of the one or more embeddings with a reference embedding for the closest matching granular category.

15. The system of claim 11, wherein the processor is further configured to: in response to a determination that the closest matching granular category meets a match threshold, categorize the website as belonging to the identified closest matching granular category.

16. The system of claim 15, wherein the processor is further configured to: store the categorization of the website in a Uniform Resource Locator (URL) filtering database.

17. The system of claim 15, wherein the processor is further configured to: determine whether to allow access to the website based on the categorization of the website.

18. A computer program product embodied in a non-transitory computer readable medium and comprising computer instructions for:
   training a concept tagging model based at least in part on a result of a large language model used to analyze training data;
   receiving text content of a website;
   applying the concept tagging model to the text content to identify one or more concept terms in the text content;
   applying an embedding model to the identified one or more concept terms to determine one or more embeddings;
   using the one or more embeddings to identify, for the website, a closest matching granular category in a taxonomy of categories; and in response to a determination that the closest matching granular category does not meet a match threshold, applying a fallback document classification model to the website to determine a closest matching general category in the taxonomy of categories and categorizing the website as belonging to the identified closest matching general category.

19. The computer program product recited claim 18, further comprising computer instructions for in response to a determination that the closest matching granular category meets a match threshold, categorizing the website as belonging to the identified closest matching granular category.

20. The computer program product recited claim 19, further comprising computer instructions for storing the categorization of the website in a Uniform Resource Locator (URL) filtering database.

21. The computer program product recited claim 19, further comprising computer instructions for determining whether to allow access to the website based on the categorization of the website.

* * * * *